UNITED STATES PATENT OFFICE.

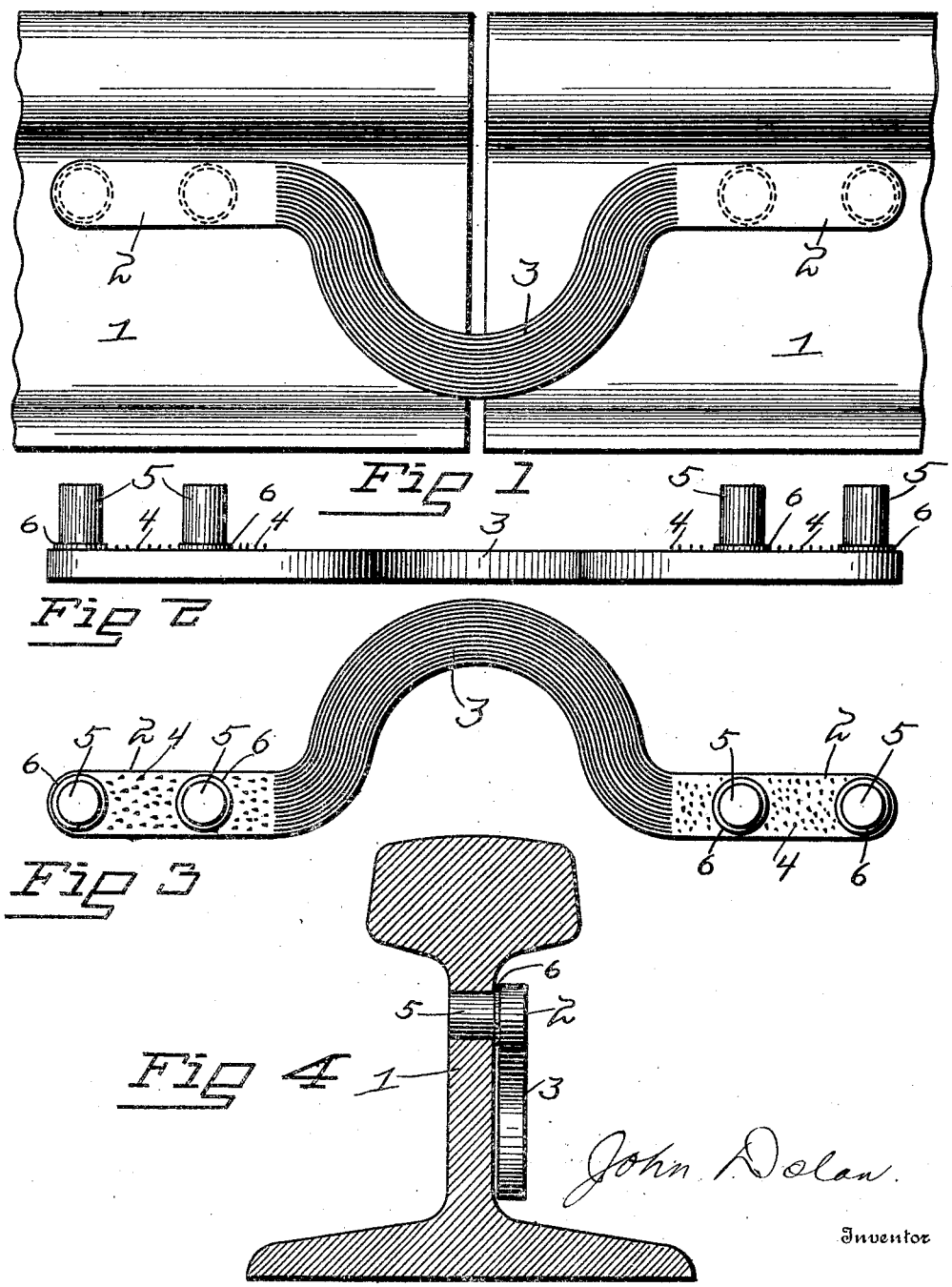

JOHN DOLAN, OF DAYTON, OHIO.

ELECTRIC-RAILWAY BOND.

No. 890,030.　　　　Specification of Letters Patent.　　　　Patented June 9, 1908.

Application filed June 15, 1906.　Serial No. 321,800.

*To all whom it may concern:*

Be it known that I, JOHN DOLAN, a citizen of the United States, residing at Dayton, in the county of Montgomery and State of Ohio, have invented certain new and useful Improvements in Electric-Railway Bonds; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in bonds for electrically connecting the adjacent ends of the rails of electric railways.

The object of the invention is to provide a rail bond with two integrally joined lugs at each end which are united to the adjacent ends of the rails by compressing said lugs within openings in said rail ends and thus dispensing with the necessity of riveting the ends of the lugs against the rail on one side or the bonds on the other side. In connection with such means for rigidly uniting the bond terminals, suitable space is provided for soldering the inner sides of the bond terminals with the adjacent surface of the rails, as hereinafter set forth in the specification and claim.

Preceding a detail description of the invention, reference is made to the accompanying drawings, of which—

Figure 1, is a side elevation of a rail joint with my improved bond forming an electrical connection between the rails. Fig. 2, is a top view of the bond detached from the rails. Fig. 3, is an elevation of the side of the bond containing the integrally-united compression lugs. Fig. 4, is a cross sectional view of a rail showing an end or terminal of the bond.

In a detail description of the invention, similar reference characters indicate corresponding parts.

The bond 3 may be of any desired shape, observing in each case the necessity of a due amount of resiliency in the body portion of the bond. In the drawings I have illustrated a common form of rail bond consisting of soft copper strips or laminations having two ends or terminals 2 2 solidified. Upon these terminals there are provided substantially flat surfaces which lie adjacent to the rail ends 1 when the bond is united to the rails. These flat surfaces of the bond terminals are preferably slightly depressed or they may be provided with a multiplicity of short spurs or projections which provide suitable space for the running of solder between the bond terminals and the rails in electrically uniting the bond to the rails.

Upon each end or terminal of the bond there are integrally united two lugs 5 which project from the portions of the terminals between which and the adjacent rail ends the solder is placed. The integrally united compression lugs 5 are of a length approximately equal to the thickness of the rail flange so that when said lugs are compressed into openings in said rail flange, their ends will lie approximately flush with the sides of the rail flanges opposite the bond terminals. These compression lugs, owing to their being tightly compressed within the openings in the rail flanges, require no riveting, but on the contrary, a more suitable connection is thus obtained by compressing said lugs within the apertures in the rail flanges. Surrounding the base of each of the integrally-united compression lugs 5 is an annular shoulder 6 which prevents the surfaces of the bond terminals making contact with the adjacent surfaces of the rails and thus provides suitable space between said lugs and between the bond terminals and the adjacent rail surfaces for the solder. The terminals, together with the compression lugs are tinned preparatory to their attachment to the rails, by immersing said terminals in a bath of solder.

I claim:

A rail bond composed of laminated strips having solidified terminals each of which has two integrally - joined non - apertured lugs adapted to unite the bond terminals to adjacent ends of rails by compressing said lugs into openings in the rails provided therefor, the lengths of said lugs being approximately equal to the portions of the rails penetrated thereby, and each of said lugs being provided at its base with a surrounding shoulder by means of which suitable space is provided between the bond terminals and the rails for the application of solder.

In testimony whereof I affix my signature, in presence of two witnesses.

JOHN DOLAN.

Witnesses:
　　THOS. E. HOWELL,
　　R. J. MCCARTY.